May 22, 1962 P. MURDEN 3,036,232
ELECTRO-MECHANICAL TRANSDUCERS
Filed March 24, 1958

Inventor
P. Murden,
By
Attorney

United States Patent Office 3,036,232
Patented May 22, 1962

3,036,232
ELECTRO-MECHANICAL TRANSDUCERS
Peter Murden, London, England, assignor to International Standard Electric Corporation, New York, N.Y., a corporation of Delaware
Filed Mar. 24, 1958, Ser. No. 723,511
Claims priority, application Great Britain Apr. 10, 1957
9 Claims. (Cl. 310—26)

The present invention relates to electromechanical transducers of the magneto-strictive type.

Electric wave filters employing mechanical torsional elements are known to be useful in certain fields of operation. Such filters require suitable transducers for coupling the input and output ends to electric circuits. One form of transducer which has already been used consists of a solenoidal coil having a cylindrical core of magneto-strictive material which is coaxially magnetised, that is, so that the magnetic flux lines are circles coaxial with the cylinder. The magnetic field produced by a current flowing in the coil is parallel to the axis, and produces a torsional strain in the cylindrical core about the axis.

A suitable axial coupling is made between the cylindrical core and the torsional elements of the mechanical filter. Electro-mechanical filters of this type are described, for example, in the article entitled "Mechanical Filters" by W. van B. Roberts and L. L. Burns in the R.C.A. Review, September 1949, page 348.

For most efficient operation of the transducer, the length of the cylindrical core should be equal to half a wavelength of the torsional vibrations of the core material at the frequency of the driving current supplied to the solenoid, so that mechanical resonance at this frequency is obtained. When the transducer is used in a mechanical band-pass filter, the resonance frequency of the core should be equal to the mid-band frequency.

The energy in the vibrating core of the transducer is proportional to its volume, and it is found that when the frequency at which it is desired to use the filter is more than a few hundred kilocycles per second, the length of the core necessary for resonance is so small that insufficient energy can be communicated to the core. Thus at 500 kilocycles per second, the core should be only about ⅛ inch long for resonance.

The object of the invention is to overcome this difficulty, which it achieves by providing a core constructed from an odd number of discs each half a wavelength thick, the said discs being secured coaxially together to form a cylinder. According to one form of the invention, the discs are all of the same magneto-strictive material but are coaxially magnetised about the axis, alternately clockwise and anti-clockwise. By this arrangement the energy which can be communicated to the core at the resonance frequency is increased $n$ times where $n$ is the number of discs.

According to another form of the invention, some of the discs are of magneto-strictive material all coaxially magnetised in the same direction, and the remaining discs are of a suitable non-magnetic material such as lead glass, and are arranged alternately with the magneto-strictive discs. By appropriate choice of the non-magnetic material, the temperature coefficient of the mechanical resonance frequency of the composite core may be reduced or substantially eliminated. In this form of the invention, the energy of the core is increased $m$ times, where $m$ is the number of magneto-strictive discs.

The invention will be described with reference to the accompanying drawings, in which.

Figure 1:
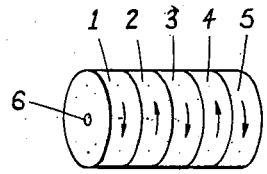
FIG. 1 shows a perspective view of a core according to the invention for an electro-mechanical transducer.

Referring to FIG. 1, one form of a torsional core according to the invention comprises five circular discs, all of the same diameter, of suitable magneto-strictive material, such as a ferrite material, designated 1 to 5. The discs may be provided with small central holes, one of which is shown at 6 in the disc 1. The discs have all the same thickness $t$. If $f$ is the mean frequency at which the core will be driven, then $t$ should be equal to half the wavelength of torsional vibrations of each disc about the axis at the frequency $f$. The odd-numbered discs are coaxially magnetised in the clockwise direction, while the even-numbered discs are coaxially magnetised in the anti-clockwise direction, as indicated by the arrows.

The five discs are rigidly secured coaxially together by a suitable adhesive, such as glue, to form a composite cylinder of total length $5t$, as shown in FIG. 1.

The central holes such as 6 are provided for convenience in magnetising the discs. Before fixing them together, a wire may be passed through the central holes of the five discs, and a magnetising direct current of suitable strength may be passed through the wire. This will magnetise all the discs coaxially in the same direction. After removal of the magnetising wire, alternate discs are turned over before fixing them together, so that after fixing, the direction of magnetisation is opposite for alternate discs.

It will be understood that the length of the composite core shown in FIG. 1 is five half-wavelengths at frequency $f$ so that it resonates on the fifth harmonic of the fundamental frequency corresponding to its total length $5t$. The core can be made up of any odd number of discs, not necessarily five.

Figure 2:
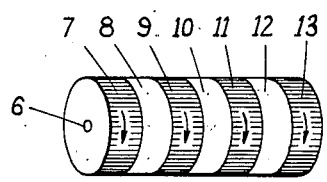
FIG. 2 shows a perspective view of another core according to the invention.

The torsional resonance-frequency of a cylinder of magneto-strictive material of given dimensions varies with temperature. By a modified arrangement according to the invention shown in FIG. 2, it is possible to reduce or eliminate the temperature variation. FIG. 2 shows a composite core made up of seven discs, secured together, designated 7 to 13. The odd numbered discs (shown shaded) are of ferrite or other magneto-strictive material, all coaxially magnetised in the same direction, as shown by the arrows. The even-numbered discs (shown unshaded) are of non-magnetic material, such as lead glass, having a resonance-frequency temperature-coefficient of opposite sign to that of the ferrite material. All the discs are of the same diameter, and each of them is half a wavelength thick at the operating frequency, which means that, in general, the thickness of the non-magnetic discs will be different from the thickness of the others, owing to the different mechanical properties of the two materials.

Since in FIG. 2 all the magneto-strictive discs are magnetised in the same direction, if all the discs are provided with small axial holes such as 6, FIG. 1, the magneto-strictive discs may be magnetised after all the discs have been secured together to form the complete core, by threading a wire through the axial holes and passing a suitable magnetising current through the wire.

The core shown in FIG. 2 may comprise any odd number of discs, not necessarily 7, of alternately magneto-strictive and non-magnetic material. While it is preferable that the end discs should be of magneto-strictive material as shown in FIG. 2, this is not essential, and the discs 7 and 13 could, for example be omitted.

The preferred material for the magneto-strictive discs shown in FIGS. 1 and 2 is a ferrite material each 100 molecules of which comprise 49 molecules of $Fe_2O_3$ and 51 molecules of NiO. This material has a negative temperature coefficient of resonance frequency. If in the core shown in FIG. 2 the discs 8, 10 and 12 are made of a lead glass, they will have a positive temperature coefficient of resonance frequency which will compensate, at least partially, the temperature coefficient of the ferrite discs.

Figure 3:
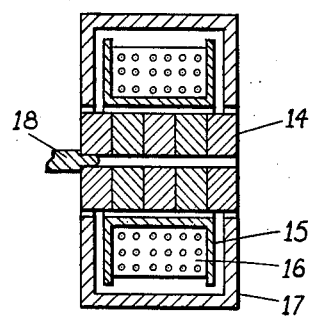
FIG. 3 shows an axial section of a complete electro-mechanical transducer comprising a core of the kind illustrated in FIG. 1.
Figure 4:
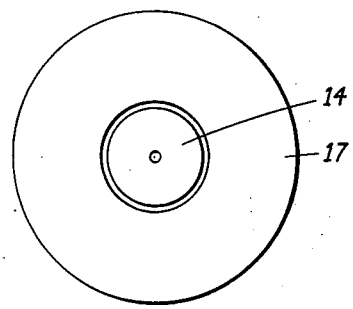
FIG. 4 shows an end view of the transducer looking in the direction of the arrow in FIG. 3.

FIGS. 3 and 4 show a complete electro-mechanical transducer of generally conventional pattern, except that a magneto-strictive core according to the invention is used, namely that illustrated in FIG. 1. The core 14, made up of five discs of ferrite or other magneto-strictive material, coaxially magnetised alternately in opposite directions, is coaxially surrounded by a non-magnetic spool 15 shown in FIG. 3, on which is wound a solenoidal winding 16 to which a driving current of mean frequency $f$ is supplied. The spool 15 is preferably enclosed in a cylindrical screening box 17 of suitable magnetic material, such as ferrite. This concentrates the magnetic field on the core 14.

A rod, the end of which is shown at 18, is secured in a suitable manner to the core 14 for coupling to the elements of the mechanical filter (not shown).

When a current of frequency $f$ is supplied to the winding 16, torsional vibrations are set up in the core 14, and 2½ complete wavelengths are comprised in the length of the core at resonance. This requires adjacent discs to rotate in opposite senses, and this requirement is fulfilled by coaxially magnetising the discs in opposite senses as shown in FIG. 1.

The transducer shown in FIGS. 3 and 4 may alternatively be provided with a core like that shown in FIG. 2, the dimensions of the parts being of course modified accordingly. The operation is the same, except that in this case 3½ complete wavelengths will be comprised in the length of the core. This time, however, the magneto-strictive discs all rotate in the same sense, and the non-magnetic discs in the opposite sense, so that all the magneto-strictive discs require to be magnetised in the same direction, as shown in FIG. 2. The non-magnetic discs, of course, do not contribute anything to the driving of the core, so in this case the energy supplied to the core is four times, not seven times, the energy supplied to one of the magneto-strictive discs. When the core of FIG. 1 is used, all the discs contribute to the driving of the core, so that the energy supplied to the core is five times the energy supplied to one of the discs.

While the principles of the invention have been described above in connection with specific embodiments, and particular modifications thereof, it is to be clearly understood that this description is made only by way of example and not as a limitation on the scope of the invention.

What I claim is:

1. A magneto-strictive core element comprising: a first plurality and a second plurality of discs, the discs of said first plurality being alternately arranged and secured to the discs of said second plurality, the total number of discs being odd and forming a composite cylindrical body; the discs of said first plurality of discs comprising magneto-strictive material and being permanently coaxially magnetized in the same direction with respect to said cylindrical body, the thickness of all of said discs being substantially equal to a half wavelength of the torsional vibrations of the magneto-strictive material at frequency $f$.

2. A core element according to claim 1 in which the discs of said second plurality of discs are also of magneto-strictive material and are coaxially magnetised in the opposite sense to the discs of said first plurality of discs of magneto-strictive material.

3. A core element according to claim 1 in which the discs of said second plurality of discs are of non-magnetic material.

4. A magneto-strictive core element for an electro-mechanical transducer for operation at a given frequency $f$, comprising three or higher odd number of equal discs of magneto-strictive material secured coaxially together to form a composite cylindrical body, the thickness of each disc being substantially equal to half a wavelength of torsional vibrations of the magneto-strictive material at frequency $f$, the said discs being coaxially magnetised alternately in opposite senses.

5. A magneto-strictive core element for an electro-mechanical transducer for operation at a given frequency $f$, comprising one or more discs of magneto-strictive material all coaxially magnetised in the same sense, arranged alternately with one or more discs of non-magnetic material to form a coaxial pile, the discs being all secured together to form a composite cylindrical body, the total number of discs being odd, and the thickness of each disc being substantially equal to half a wavelength of torsional vibrations at frequency $f$ of the material of which the disc is composed.

6. A core element according to claim 5 in which the said non-magnetic material has a temperature coefficient of mechanical resonance frequency of opposite sign to that of the magneto-strictive material.

7. An electro-mechanical transducer comprising a core element according to claim 4, further comprising a solenoidal driving coil surrounding said core.

8. An electro-mechancial transducer in accordance with claim 7, further comprising a magnetic circuit surrounding the ends and the outer surface of said coil.

9. A magneto-strictive core element comprising a plurality of discs of magneto-strictive material rigidly secured together to form a coaxial pile, alternate discs being coaxially magnetised in a clockwise and counterwise direction respectively.

References Cited in the file of this patent

UNITED STATES PATENTS

| | | |
|---|---|---|
| 2,834,943 | Grisdale et al. | May 13, 1958 |
| 2,891,178 | Elmore | June 16, 1959 |
| 2,891,180 | Elmore | June 16, 1959 |